Figure 1:
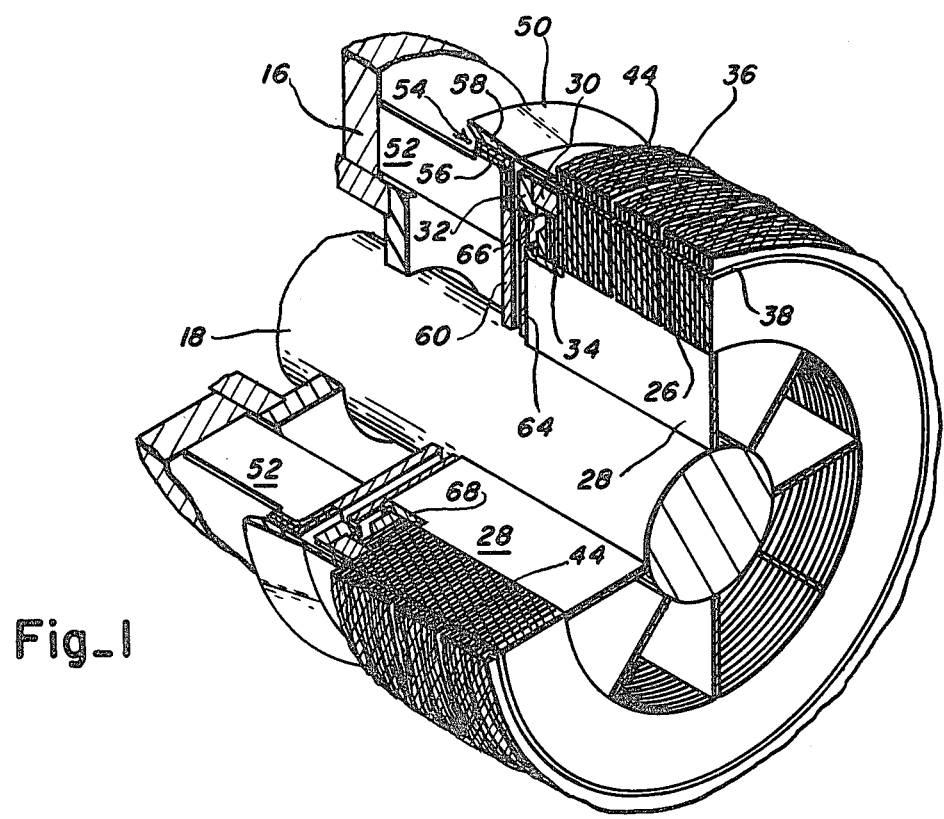

United States Patent [19]

Gaylord

[11] 4,445,056
[45] Apr. 24, 1984

[54] MEANS FOR IMPROVING THE OPERATION OF LIQUID FILLED ELECTRIC MOTORS

[75] Inventor: David F. Gaylord, Hales Corners, Wis.

[73] Assignee: Litton Industrial Products, Inc., Beverly Hills, Calif.

[21] Appl. No.: 316,788

[22] Filed: Nov. 2, 1981

[51] Int. Cl.³ ............................................. H02K 9/00
[52] U.S. Cl. ...................................... 310/54; 310/65; 310/86
[58] Field of Search ....................... 310/52, 54, 58, 87, 310/60 A, 61, 54, 65, 90, 261, 265, 53, 86

[56] References Cited

U.S. PATENT DOCUMENTS

| | | |
|---|---|---|
| 2,002,910 | 5/1935 | Mendenhall et al. . |
| 2,002,911 | 5/1935 | Mendenhall et al. . |
| 2,011,341 | 8/1935 | Mendenhall et al. . |
| 2,600,277 | 6/1952 | Smith . |
| 2,618,756 | 11/1952 | Fechheimer ......................... 310/65 |
| 2,698,911 | 1/1955 | Schaefer . |
| 2,703,371 | 3/1955 | Wightman . |
| 2,887,061 | 5/1959 | Cametti et al. . |
| 2,911,918 | 11/1959 | Reed ..................................... 310/86 |
| 2,951,954 | 9/1960 | Willyoung ............................ 310/58 |
| 2,994,793 | 8/1961 | Sills ...................................... 310/61 |
| 3,433,986 | 3/1969 | Arutunoff . |
| 3,629,627 | 12/1971 | Dafler .................................. 310/54 |
| 3,742,595 | 7/1973 | Lykes . |
| 3,777,194 | 12/1973 | Schaefer et al. . |
| 3,873,861 | 3/1975 | Halm . |
| 3,969,643 | 7/1976 | Säpper ................................. 310/53 |
| 4,010,392 | 3/1977 | Bogdanov et al. . |
| 4,015,633 | 4/1977 | Mandell . |

Primary Examiner—J. D. Miller
Assistant Examiner—D. L. Rebsch
Attorney, Agent, or Firm—John M. Haurykiewicz; Walter R. Thiel

[57] ABSTRACT

In an electric motor operating with a liquid filled housing, friction and hydraulic losses are reduced and heat removal is improved. A first collar is mounted on the end of the stator coaxially therewith. A second collar is positioned in proximity to the first collar. An annular plate extends from the second collar and faces the end of the rotor. The plate is spaced from the end of the rotor and from the rotor shaft. The rotor has a surface opposing the annular plate. The collars and annular plate form a liquid turbulence reducing shroud for the end of said rotor. The opposing surfaces of the annular plate and rotor move liquid outwardly toward the stator bore and the collars divert the liquid down the air gap for heat removal purposes. The first collar protects the end turns of the stator from abrasion by the moving liquid.

10 Claims, 2 Drawing Figures

Fig_1

MEANS FOR IMPROVING THE OPERATION OF LIQUID FILLED ELECTRIC MOTORS

In certain applications, electric motors operate with liquid filled housings. For example, motors exposed to high pressure sea water environments may be filed with a liquid, such as oil, to obtain pressure compensation for the motor.

The presence of the liquid increases the losses in the motor over those experienced when the motor is operated in air, as in more conventional applications. The increased losses result from the viscous properties of the liquid and from the pumping action imposed on the liquid by the rotating parts of the motor.

The foregoing losses, plus the normal electrical losses of the energized motor, generate heat. Proper circulation of the liquid within the housing is required to prevent excessive heat buildup in the motor.

The pumping action produced by the rotating parts causes high velocities in the liquid at the ends of the rotor. This high velocity liquid stream impinges on the exposed end turns of the stator coils adjacent the rotor ends, tending to wear away the insulation on the stator coil conductors.

The present invention is directed to an improved construction for a liquid filled electric motor that reduces hydraulic losses, provides efficient circulation of the liquid through the motor to obtain highly effective heat removal within the motor; and avoids damage to the exposed end turns of the stator coils.

Briefly, the present invention utilizes a shroud-like member extending along the inside of the stator end turns and from the end turns into proximity with the rotor shaft. This shroud-like member reduces liquid churning that would otherwise result from the rotation of the rotor. To facilitate assembly of the motor, the shroud-like member is preferably formed of a first, annular, collar mounted inside the stator end turns. The first collar means is in proximity with a second collar means mounted coaxially therewith on the motor housing or otherwise. The second collar has a plate extending towards the rotor shaft alongside the end of the rotor. The liquid between the plate and rotor end is centrifugally pumped by the end of the rotor. The spacing between the collars is less than the air gap of the motor to insure that the bulk of the liquid is forced down the air gap, thereby providing effective cooling to the motor. The liquid is typically discharged through vents in the stator. Smooth surfaces of the opposing plate and rotor end in the areas of high velocity fluid motion provide efficiency to the pumping action. The first collar means provides abrasion protection to the stator coils at the ends of the rotor where the high velocity fluid would otherwise impinge on the coils.

The end of the motor rotor may also have a plate extending from the shaft to the rotor end ring. The rotor has a band extending around the rotor bars and sealed to the end ring and rotor laminations to limit the pumping action to the opposing plate and rotor end.

IN THE DRAWING

Figure 2:
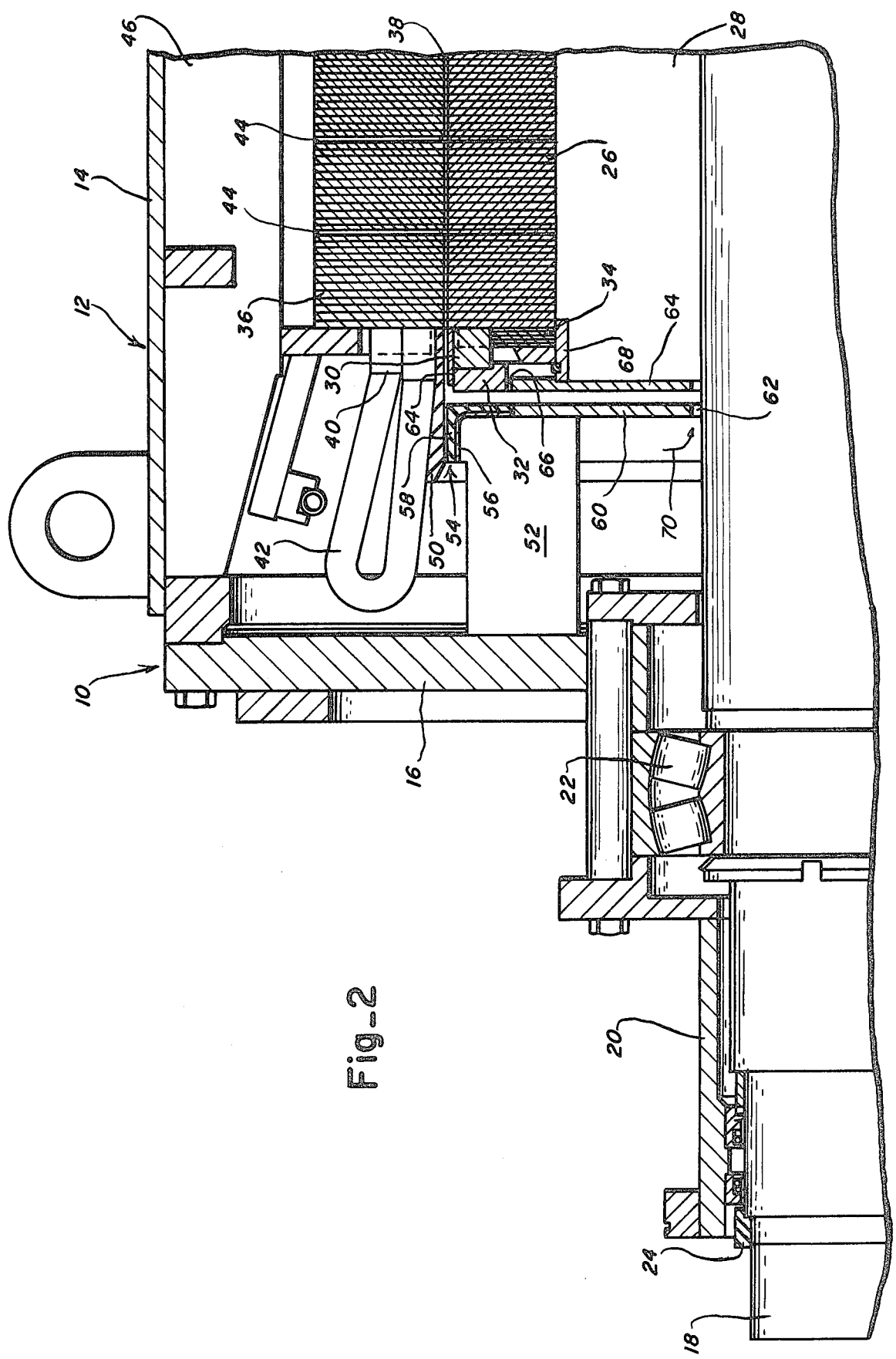

FIG. 1 is a fragmentary partially broken away, perspective view of the rotor and stator portions of a liquid filled electric motor incorporating the improvement of the present invention; and FIG. 2 is a fragmentary cross-sectional view of the motor and the improvement of the present invention.

Motor 10 includes housing 12 formed of shell 14 sealed by bearing brackets 16 at either end. Output shaft 18 extends through sleeve 20 on bearing bracket 16. Sleeve 20 contains appropriate bearings and seals, 22 and 24. Motor 10 is designed for operation under conditions of high environmental pressure, for example, from submergence in sea water. To compensate for the external pressure existing under such conditions, housing 12 is filled with a liquid, such as oil.

Motor 10 may be of the induction type to include laminated rotor 26 mounted on output shaft 18 by spider 28. Rotor 26 contains rotor bars 30 joined by end rings 32. Finger plate 34 is positioned at the end of rotor 26 for retaining the laminations on the spider.

Motor 10 also includes laminated stator 36 surrounding rotor 26 and spaced therefrom by air gap 38. Stator winding 40 has end turns 42 extending from its ends. Vents 44 in the laminations of stator 36 provide passageways from air gap 38 to the periphery of stator 36. Stator 36 may be mounted in housing 12 by bars 46. Stator 36 may be encapsulated in an insulating resin by a vacuum pressure impregnation process.

In the improvement of the present invention, collar 50 is provided at the end of stator 36, along its bore, and beneath end turns 42. To form collar 50, a fibrous, insulating material, such as glass or dacron mat may be laced or bonded along a predetermined axial length of end turns 42 prior to the impregnation of the stator. After the stator has been impregnated, collar 50 is bored so that it is smooth and concentric to the stator bore. The inner surface of collar 50 may be chamfered, if desired, as shown in FIG. 2.

Bearing bracket 16 contains a plurality of arcuately spaced arms 52 extending axially toward rotor 22. Six or eight such arms may be provided. A second collar 54, of generally L-shape, is provided on arms 52 in proximity with collar 50. As shown in FIG. 2, collar 54 may be of two piece construction having an inner support 56 formed of aluminum or other non-magnetic material with a cover 58 that may be formed of a resin impregnated, fibrous, insulating material, such as that used to form collar 50, bonded thereto. The exterior of collar 54 is machined to a close clearance with the bore of collar 50. This clearance is one suitable for the manufacturing processes involved and is preferably less than the dimension of air gap 38.

Smooth annular plate 60 is fastened on arms 52 to extend radially inward from collar 54 toward output shaft 18. Spacing 62 is provided between plate 60 and output shaft 18.

In rotor 26, non-magnetic band 64 is placed about rotor bars 30 and sealed to the rotor laminations and to end ring 32. The exterior diameter of band 64 resembles that of the rotor itself. Band 64 may be formed of stainless steel or copper. Smooth plate 66 extends radially outward from output shaft 18 along the end of rotor 26 into proximity with end ring 32. Band 68 is placed around the arms of spider 28 and sealed to the rotor laminations and to plate 66. Plate 66, end ring 32, band 64, and band 68 close off spider 28 and the region under rotor bars 30 to minimize or eliminate liquid flow to and from these areas and pumping action by these elements.

In operation, the shrouding of the end of rotor 26 by collars 50 and 54, plate 60, and plate 66 reduces the churning of the liquid that would otherwise result from the rotation of rotor 26. This reduces losses.

Liquid is drawn in along spacing 62 between plate 60 and output shaft 18 as shown by the arrow 70 and is moved radially outward between plates 60 and 66 by the centrifugal pumping effect produced by the rotation of rotor 26 and plate 66. The spacing between plates 60 and 66 controls the amount of fluid subjected to the pumping action. The quantity may be limited to that necessary to provide the necessary cooling action to motor 10, thereby reducing losses that would otherwise occur when excess quantities of liquid are pumped. The close fit between collars 50 and 54 insures that the bulk of the liquid is forced down gap 38 to carry off the heat generated in the rotor-stator radial gap of the motor in a highly efficient manner. From there, it passes through vents 44 in stator 36. Plates 60 and 66 provide smooth surfaces in the areas of high velocity fluid motion, further reducing hydraulic losses.

Collar 50 provides protection for stator end turns 42 at the end of rotor 26 where the high velocity fluid would otherwise impinge.

While the improvement of the present invention has been shown and described, above, in connection with only one end of the motor for purposes of conciseness, it will typically be employed at both ends. Further, while the shroud has been described as formed of a plurality of parts, such as collar 50, collar 54, and plate 60 for ease of assembly of motor 10, it could be formed of a single element, if desired. The proximity of collars 50 and 54 is shown as aligned with gap 38. However, the diameter of the collars could be adjusted so that the area of proximity was radially inwardly or outwardly from a position of alignment with the gap.

Various modes of carrying out the invention are contemplated as being within the scope of the following claims particularly pointing out and distinctly claiming the subject matter which is regarded as the invention

I claim:

1. In an electric motor operating with a liquid filled housing and having a shaft mounted rotor rotating in the bore of a concentric stator and spaced therefrom by a radial gap, improved means for reducing losses while improving heat removal from the motor comprising:
   first collar means mounted on at least one end of the stator coaxially therewith;
   means operatively associated with the stator positioning a second collar means in proximity to said first collar means, said positioning means having an annular plate extending from said second collar means, said annular plate facing an end of the rotor and being spaced from the end of the rotor and from the rotor shaft; and means operatively associated with said rotor for providing a surface opposing said annular plate, said collar means and plate forming a liquid turbulence reducing shroud for the end of said rotor and the opposing surfaces of said annular plate and means operatively associated with the rotor, moving liquid outwardly toward the stator bore, said collar means directing the liquid into the radial gap for heat removal purposes.

2. The improvement according to claim 1 wherein the stator contains vents extending to the radial gap and wherein said improved means is found at both ends of the rotor and stator.

3. The improvement according to claim 1 wherein said first and second collar means are radially spaced from each other.

4. The improvement according to claim 3 wherein the spacing of said first and second collar means is less than the radial gap of the motor.

5. The improvement according to claim 1 wherein said first collar means has the same inner diameter as the stator bore.

6. The improvement according to claim 1 wherein the stator has exposed end turns and wherein said first collar means is mounted radially inwardly of the end turns for protecting same from abrasion by high velocity liquid.

7. The improvement according to claim 1 wherein the surfaces of said improved means along which the liquid flows are smooth.

8. The improvement according to claim 6 including an additional plate means providing the rotor mounted surface opposing the annular plate of said positioning means.

9. The improvement according to claim 1 wherein the rotor has circumferentially spaced rotor bars extending from the end thereof and joined to an end ring and wherein the improvement includes a band extending around the bars and sealed to the rotor end ring and the end of the rotor.

10. The improvement according to claim 8 wherein the rotor is mounted on a support having a plurality of circumferentially spaced arms extending from the shaft and wherein said additional plate means closes said support means.

* * * * *